(12) United States Patent
Pauli

(10) Patent No.: US 9,558,342 B2
(45) Date of Patent: Jan. 31, 2017

(54) SECURED REPAIR DATA PACKAGE

(75) Inventor: Joakim Pauli, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/008,543

(22) PCT Filed: Mar. 29, 2011

(86) PCT No.: PCT/EP2011/001564
§ 371 (c)(1),
(2), (4) Date: Feb. 5, 2014

(87) PCT Pub. No.: WO2012/130257
PCT Pub. Date: Oct. 4, 2012

(65) Prior Publication Data
US 2014/0222282 A1    Aug. 7, 2014

(51) Int. Cl.
*G06F 21/44* (2013.01)
*G06F 21/31* (2013.01)
(Continued)

(52) U.S. Cl.
CPC ............. *G06F 21/44* (2013.01); *B60S 5/00* (2013.01); *G06F 21/31* (2013.01); *G06F 21/572* (2013.01);
(Continued)

(58) Field of Classification Search
CPC ........ G06F 21/44; G06F 21/31; G06F 21/572; B60S 5/00; H04L 63/0428; H04L 63/083; H04L 63/10; H04L 67/12
(Continued)

(56) References Cited

U.S. PATENT DOCUMENTS 4,999,806 A * 3/1991 Chernow et al. ............. 717/177
6,772,090 B2 * 8/2004 Hutton et al. ................. 702/165
(Continued)

FOREIGN PATENT DOCUMENTS

EP    1583039 A1    10/2005
EP    2110766 A1    10/2009
(Continued)

OTHER PUBLICATIONS

Idrees et al. (Non-Patent literature, "Secure Automotive On-Board Protocols: A Case of Over-the-Air Firmware Updates"), hereinafter Idrees.*
(Continued)

*Primary Examiner* — Yazan Soofi
(74) *Attorney, Agent, or Firm* — WRB-IP LLP

(57) ABSTRACT

An arrangement for storing a data set in an ECU in a vehicle control system, wherein the arrangement includes a computer connected to the vehicle, where the computer is adapted to execute an access application, where the access application includes vehicle specific information and service action specific information, and where the information is encrypted, where the arrangement is adapted to decrypt the vehicle specific information and the service action specific information, to unlock the vehicle ECU by sending a password from the computer to the ECU, to perform a service action by storing service action specific information in the ECU, to lock the ECU by sending a lock command to the ECU from the computer, and to corrupt the access application software such that it cannot be used again.

16 Claims, 2 Drawing Sheets

(51) Int. Cl.
*G06F 21/57* (2013.01)
*H04L 29/06* (2006.01)
*B60S 5/00* (2006.01)
*H04L 29/08* (2006.01)

(52) U.S. Cl.
CPC ......... *H04L 63/0428* (2013.01); *H04L 63/083* (2013.01); *H04L 63/10* (2013.01); *H04L 67/12* (2013.01); *G06F 2221/2143* (2013.01)

(58) Field of Classification Search
USPC ........................................................ 701/32.6
See application file for complete search history.

(56) References Cited

U.S. PATENT DOCUMENTS

| | | | |
|---|---|---|---|
| 7,317,974 B2* | 1/2008 | Luskin et al. | ............... 701/31.5 |
| 7,551,986 B2 | 6/2009 | Ando | |
| 7,630,800 B2 | 12/2009 | Hirano et al. | |
| 2003/0009271 A1 | 1/2003 | Akiyama | |
| 2003/0014642 A1 | 1/2003 | Martinsson et al. | |
| 2005/0187674 A1* | 8/2005 | Ando | ................ 701/1 |
| 2008/0278282 A1* | 11/2008 | Waldmann | ............ G06F 21/445 |
| | | | 340/5.8 |

FOREIGN PATENT DOCUMENTS

| | | |
|---|---|---|
| JP | 2001225706 | 8/2001 |
| JP | 2007261381 | 10/2007 |
| WO | 2010057541 A1 | 5/2010 |

OTHER PUBLICATIONS

International Search Report (Mar. 2, 2012) for corresponding International application No. PCT/EP2011/001564.
Japanese Official Action (translationAug. 14, 2015) for corresponding Japanese Application 2014/501446.

* cited by examiner

SECURED REPAIR DATA PACKAGE

BACKGROUND AND SUMMARY

The present invention relates to an arrangement and method for storing a data set in an ECU in a vehicle control system according to the preamble of claim 1. The invention further relates to a computer program adapted to perform a method for storing a data set in an ECU in a vehicle control system when said program is run on a computer, and a computer program product comprising such program code means stored on a computer readable medium. The arrangement is suitable for workshops working with vehicles of different kinds, both passenger vehicles and heavy vehicles.

In a work shop for repairing vehicles, computers are used more and more both for diagnostics of faults on the vehicle and for updates of the vehicle control system. Normally, each vehicle manufacturer uses their own specific computer equipped instruments for diagnostic purposes and also their own computer based system for updating the control system of the vehicle. The vehicle control system comprises several Electronic Control Units (ECU) connected to each other through one or more buss systems, where each ECU comprises a specific software adapted for that specific ECU and the functions controlled by the ECU.

By connecting the workshop update system for updating the software in one or more ECUs in the vehicle, a handshake routine is performed between the workshop update system and the ECU in order to prepare the ECU for the update and to make sure that the workshop system is authorized to update the ECU. When the handshake is successfully finished, the new software or data can be uploaded to the ECU and stored in a memory in the ECU. When the update is completed, the ECU is returned to a working condition.

In order to ensure that only authorized workshops can update software in the control system of the vehicle, the initial handshake between the workshop update system and the ECU will normally comprise an unlock procedure in which the workshop update system sends a password to the ECU in order to unlock the ECU and to make sure that the workshop update system is authorized to update the ECU. When the update is completed, the ECU is locked again such that no unauthorised personal can access the ECU. This unlock procedure is manufacturer specific and is normally integrated in the specific workshop update system provided by a manufacturer. The use of such a system is normally only allowed for approved and appointed retailers and distributors and their workshops.

Coming legislation will force the vehicle manufacturers to provide information regarding diagnostics and updates of the vehicle control system both to independent workshops and to external tool vendors. In this way, independent workshops will be able to diagnose and update vehicles from different manufacturers by using the same protocols as the official workshops of a specific manufacturer. External tool vendors will be able to offer computerized tools for both diagnostics and for updating data in vehicles of different manufacturers.

The purpose of the new legislation is to prevent manufacturers to stop independent workshops from repairing vehicles from that manufacturer. A further purpose is to allow independent tool vendors to provide tools to independent workshops that can communicate with vehicles from different manufacturers. In this way, it will be easier for an independent workshop to afford the tools required for repairs of a vehicle from a specific manufacturer. The specific original tools offered by the manufacturer have historically been too expensive for most independent workshops, especially considering when a workshop needs tools form several different manufacturers. Sometimes, a specific tool is required for each vehicle model. This situation has lead to the fact that some repairs on a vehicle has only been possible to do at manufacturer-approved workshops.

Because of this, the manufacturer must be able to ensure that their vehicles are safe to be used in traffic and that they have not been manipulated with by a third party. If a workshop accidentally or on purpose updates the wrong data or changes the wrong software, the consequence may be that the vehicle no longer behaves as expected. This in turn will lead to insecurity for the user, concerning who is responsible for the performance and specifications of the vehicle. Several cases are already known, where the manufacturer of a vehicle has had to justify the performance and specifications of a vehicle involved in an accident, on which vehicle an independent workshop had made modifications which were not approved by the manufacturer. These modifications did not involve any data update in the vehicle control system. When every workshop has the possibility to update data in the vehicle control system, it will be impossible for a manufacturer to guarantee the road safety of their vehicles without any type of authorization to perform the update.

At the same time, the manufacturer must also be able to guarantee the specifications of a vehicle, e.g. when it comes to carbon dioxide emissions or the power of the engine. There is a possibility that unscrupulous workshops or mechanics use the possibility to modify data in order to manipulate the specifications of the vehicle such that the specifications no longer conform to the specifications of the original vehicle.

U.S. Pat. No. 7,551,986 describes a system for distributing software to a vehicle. A program distribution system having a vehicle type table is used to distribute vehicle-specific software using an in-vehicle gateway. The program distributing system can also use an identifier to control that no alterations has been made to the software during the distribution. This solution may solve the problem of distributing software to a vehicle in a secure way, but does not mention the problem of updating data in the vehicle.

There is thus room for improvements.

It is desirable to provide an improved arrangement for storing a data set in an ECU in a vehicle control system. It is also desirable to provide an improved method for storing a data set in an ECU in a vehicle control system.

In an arrangement for storing a data set in an ECU in a vehicle control system, wherein the arrangement comprises a computer means connected to the vehicle, where the computer means is adapted to execute an access application, where the access application comprises vehicle specific information and service action specific information, and where the information is encrypted, where the arrangement is adapted to decrypt the vehicle specific information and the service action specific information, to unlock the vehicle ECU by sending a password from the computer means to the ECU, to perform a service action by storing service action specific information in the ECU and to lock the ECU by sending a lock command to the ECU from the computer means, the arrangement is adapted to corrupt the access application software after the service action specific information is stored in the ECU such that it cannot be used again.

By this first embodiment of the arrangement for storing a data set in an ECU in a vehicle control system, an arrangement with which an independent workshop can be allowed to update a vehicle in a secure manner is obtained. In the inventive arrangement, the independent workshop receives a specific access application from the manufacturer, which corresponds to the exact needs of the workshop for that specific repair action. When the access application is ordered by the workshop, the workshop specifies the exact vehicle, e.g. by supplying the serial number of the vehicle, and the repair action that is to be performed. A central database of the manufacturer will then compile the access application for that specific repair action. The access application will comprise all the necessary code and data that will be required to access and update the vehicle control system. The data will be encrypted such that unauthorized access to the data itself is prohibited. The access application will further comprise a function that will corrupt the access application when the repair action is completed, such that the access application cannot be used more than once. In this way, the manufacturer can allow any independent workshop to perform repair actions requiring software updates in a secure and controlled manner, without the risk that a third party will be able to retrieve secret information.

In an advantageous development of the inventive arrangement, the access application is adapted to be used for a predefined number of vehicles, and the corruption of the access application software is performed after the access application has been used the predefined number of times. In this way, it is possible for a work shop to order an access application that can be used for several similar vehicles, where at least the specification for the specific component is the same. This may e.g. be the case for a general component that is used on several different types of cars, and where the access application only contains specific information regarding that specific component, e.g. calibration data or data that identifies that specific component. Such data may e.g. be data identifying a specific type of brake pads used to set the brake parameters of the vehicle or calibration data for a specific sensor used on different car models. This may be advantageous for fleet owners that owns several similar or identical vehicles, or for workshops performing a campaign when several identical components are replaced.

In an advantageous development of the inventive arrangement, the arrangement is adapted to update one or more data parameters corresponding to a vehicle component. In this way, it is possible to update an ECU of the vehicle control system with new parameters corresponding to a specific vehicle component, e.g. calibration data for a replaced component. It is also possible to recalibrate an existing vehicle component, e.g. due to drift or to adapt it to another replaced vehicle component. Since the source code or the original access code must not be supplied to the workshop in question, the manufacturer can allow independent workshops to replace vehicle components that require a software update of the vehicle control system.

It is also possible to update one or more data parameters corresponding to different vehicle components at the same time. In this way, more than one ECU of the vehicle control system may be updated with new parameters corresponding to the different vehicle components by using the same access application.

In an advantageous development of the inventive arrangement, the arrangement is adapted to add a software module to existing software in the ECU. This will allow independent workshops to add functions to the vehicle control system, both dedicated software functions and software functions associated with a new vehicle component that is added to the vehicle.

In an advantageous development of the inventive arrangement, the access application is compiled by the manufacturer of the specific vehicle. In this way, it is ensured that the access application is adapted to the specific vehicle. Since the data of the manufacturer regarding a specific vehicle is always up to date, compatibility issues are reduced as much as possible.

In an advantageous development of the inventive arrangement, the access application comprises information that will unlock more than one ECU in the vehicle. In this way, updates in the vehicle control system can be performed for vehicle parameters that are stored in more than one location.

In an advantageous development of the inventive arrangement, the access application for a specific vehicle is compiled by the manufacturer of the vehicle when a workshop demands it. This is of advantage for vehicle data that relies on other vehicle systems that in turn may be updated. In this way, it is ensured that the latest vehicle data is always used.

In an advantageous development of the inventive arrangement, the access application that comprises data corresponding to a specific hardware part is compiled when the hardware part is produced. In this way, the specific parameter, e.g. calibration parameters, for a component can be retrieved in an easy way. The access application may be linked to the hardware part by a unique number, which enables the access application to be retrieved by sending the unique number to the manufacturer of the hardware part and/or to the manufacturer of the vehicle. In this way, the workshop can obtain the access application without the need of supplying the vehicle specifications.

In a method for storing a data set in an ECU in a vehicle control system, the steps of executing an access application on a computer connected to the vehicle, where the access application comprises vehicle specific information and service action specific information, where the information is encrypted, decrypting the vehicle specific information and the service action specific information by the access application, unlocking the vehicle ECU by sending a password from the access application to the ECU, performing a service action by storing service action specific information in the ECU, locking the ECU by sending a lock command to the ECU from the access application, and corrupting the access application software such that it cannot be used again are comprised.

With the inventive method, a safe and secure way to update and store a data set in a vehicle control system is obtained. Since all important information required for performing the update is included in the access application, which is decrypted, independent workshops can be entrusted to perform software updates on vehicles from a specific manufacturer. The inventive method further allows independent tool vendors to supply update tools for different vehicles, without the need to provide the tool vendor with manufacturer specific data, such as passwords to the vehicle control system. The manufacturer of a vehicle will thus be able to ensure the specifications of a vehicle even when a component requiring a data update has been replaced by an independent workshop. The method further ensures that the correct data parameters are used for the update, since the access application is compiled by the manufacturer.

In an advantageous development of the inventive method, the service action comprises an update of data parameters corresponding to a vehicle component. The advantage is that the vehicle control system can be updated or recalibrated with new parameters corresponding to a specific vehicle component, e.g. calibration data for a replaced component, in an easy and secure manner. Since the source code or the original access code must not be supplied to the workshop in question, the manufacturer can allow independent workshops to replace vehicle components that require a software update of the vehicle control system.

In an advantageous development of the inventive method, the service action comprises adding a software module to existing software in the ECU. In this way, a software function can be added to the vehicle control system, both a dedicated software function and a software function associated with a new vehicle component that is to be mounted to the vehicle. This allows independent workshops to update vehicles with software functions in a secure and controlled manner.

In an advantageous development of the inventive method, the access application is compiled by the manufacturer of the specific vehicle. In this way, it is ensured that also independent workshops use the proper vehicle parameters.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the claims.

Figure 1:
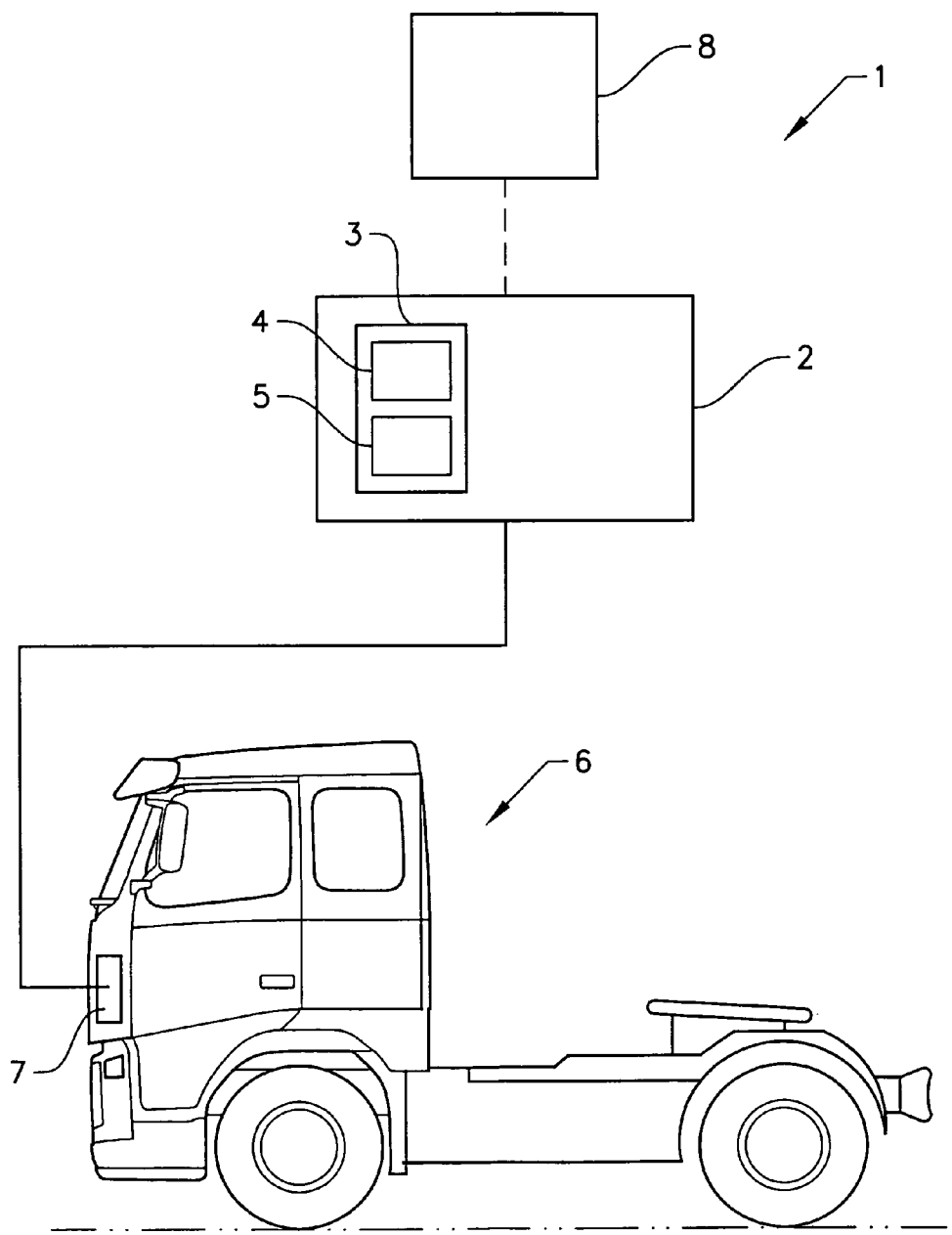
FIG. 1 shows a schematic view of an arrangement for storing a data set in an ECU in a vehicle according to the invention.

FIG. 1 a schematic view of an arrangement for storing a data set in an ECU in a vehicle according to the invention. In the description, an independent workshop is used as an example of a user of the arrangement, and a truck is used as an example of a vehicle. Other types of users are of course also possible, such as workshops approved by the manufacturer or company-owned workshops. Other types of vehicles are also possible, such as passenger cars, buses, construction vehicles, boats and the like. The arrangement 1 comprises a computer means 2 connected to the vehicle 6, where the computer means is adapted to execute an access application 3 comprises vehicle specific information 4 and service action specific information 5, where the information is encrypted. The computer means is connected to the vehicle control system of the vehicle, and more specifically to an ECU 7 of the vehicle. The access application is compiled in a remote location outside of the workshop, preferably at a central database 8 of the manufacturer of the vehicle, where information regarding the different vehicles and different service actions are stored.

The computer means is adapted to decrypt the vehicle specific information and the service action specific information such that the information can be forwarded to the ECU of the vehicle and can be stored in a memory area in the ECU. The service action information also comprises information for retrieving a password from the encrypted information. The access application is adapted to unlock the vehicle ECU by sending the password from the computer means to the ECU. When the ECU is unlocked, the service action is performed, in which service action specific information is stored in the ECU. After the service action is completed, the ECU is locked by sending a lock command to the ECU from the computer means. When the complete update is finished, the access application software code is corrupted such that it cannot be used again.

It is also possible that the computer means are connected to more than one ECU in order to update information in more than one ECU in the same operation, should e.g. the required information be stored in more than one location or if different ECU's stores the same information in their memories. This can be done by either unlocking one ECU after the other or by unlocking all ECU's at the same time.

In the workshop, a vehicle that is to be inspected is connected to a diagnostics instrument, e.g. a dedicated diagnostics instrument or a computer means provided with diagnostics software for the specific vehicle, and the inspection software is run on the diagnostic instrument. Depending on the type of inspection that is to be performed, different software modules may be run. When the diagnostic is ready, the diagnostics instrument can give a message reporting what part of the vehicle is faulty or broken. In one example, a sensor, e.g. an air quantity sensor in the air intake of the vehicle is broken. The diagnostic instrument detects the faulty sensor and provides a readout saying that the sensor needs to be replaced. It is of course also possible that the workshop detects the broken sensor without the diagnostic instrument. If the sensor is faulty but not broken, the diagnostic software may report that a recalibration of the sensor is enough to solve the problem.

To replace the sensor, the workshop will order a new sensor. At the same time, the workshop also orders an access application from the manufacturer of the vehicle. When ordering the access application, the workshop specifies the component for which the access application is to be adapted, e.g. by specifying an error code supplied by the diagnostics instrument or by using a component number, together with the specific vehicle for which the access application is to be used, e.g. by specifying the vehicle serial number. In this way, the manufacturer will know exactly what type of access application that is required. The data for the access application is collected from a central database of the manufacturer, and the access application is compiled by the manufacturer and stored on a computer-readable and computer-writable storage means. The compiled access application can also be sent to the workshop through the internet or by another communication link. If the sensor is only to be recalibrated, the access application will comprise data code adapted for a recalibration procedure. The compiled computer executable software access application will allow only this service action to be performed on that specific vehicle at one time.

In order to replace the sensor or to recalibrate the sensor, there is a need for the workshop to alter data in the ECU associated with the sensor. For a recalibration, new calibration data for the sensor is stored the ECU. The calibration data may be supplied in the access application or may be measured and read by the diagnostics instrument. When the sensor is replaced, a new set of calibration parameters corresponding to that specific sensor is stored in the ECU. Since these data influences the performance of the vehicle, the area of the ECU where the data is stored is locked for unauthorised access. Thus, the workshop cannot store the new data in the ECU for the replaced or recalibrated sensor without an authorisation. In the inventive arrangement, the authorisation is comprised in the access application.

When the workshop receives the access application, the vehicle is connected to the computer means constituting an update instrument of the workshop. This update instrument may be a dedicated computerized update instrument or may be a computer provided with update software. It may also be the same as the diagnostics instrument, running an update software. The computer means may be provided by the manufacturer of the vehicle or by an independent tool vendor, or may be a regular personal computer. The access application is executed in the update instrument. The access application will first decrypt itself, retrieving the vehicle specific information and the service action specific information together with a password, such that it can communicate with the ECU in the vehicle. The first step of the update is to send an unlock command to the ECU. The unlock command comprises a password that will unlock the ECU to allow the update instrument to alter data in the ECU. It may be enough with one password for gaining access to the complete ECU, or different passwords may unlock different parts of the ECU area. When the ECU has received the proper password and is unlocked, an unlock acknowledge message is sent to the update instrument.

The update instrument will now perform the needed service action. In this example, new calibration data for the replaced sensor is to be stored in the ECU. For a new sensor, the calibration parameters may be included in the access application when the access application is compiled by the manufacturers' database, or the calibration parameters may be inputted by the workshop. When all calibration data is stored in the ECU in a proper way, the ECU sends a confirmation message to the update instrument. The access application will now send a lock command to the ECU, which will lock itself such that no access is allowed to the ECU. The ECU will acknowledge that it is locked by sending a lock acknowledge message to the update instrument. When the ECU is locked, the update procedure is completed.

The access application will now, as a last step, corrupt some of the access application software code such that the access application cannot be used again. This may be done by altering or removing parts of the access password or by corrupting parts of the access application data of the software. The access application may e.g. comprise a counter that is incremented every time the access application is used. When the access application has been used the predefined number of times, the counter will reach the predefined number and can thus not increment anymore. The counter is not incremented if the operation was not successful. It is also possible to use a decrypt key that is changed by the access application such that it cannot be used anymore. It is thus important that the access application is stored on a writable media. It is also possible to set a flag in the access application when the access application is opened that indicates that the access application may not be opened again. This flag is confirmed by the lock acknowledge message from the ECU and is stored in the access application. Regardless of how the software code of the access application is corrupted, i.e. made non-executable, it cannot be used another time for any type of action. In this way, it is secured that an additional access to the ECU is prohibited, such that it is impossible to use the access application to tamper with any other part of the vehicle system.

When the sensor is to be recalibrated, the compiled access application will contain recalibration software that can be used by the workshop for one single recalibration of the air quantity sensor. In the same way as described above, the update instrument will run the access application. It will unlock the ECU and when the ECU has sent an unlock acknowledge message to the update instrument, the recalibration of the sensor can start. The sensor is recalibrated in a known manner. When the recalibration is finished, the access application will lock the ECU and a lock acknowledge message is sent to the update instrument. The access application will then corrupt the code of itself such that it cannot be used again.

In this way, it can be ensured that the specifications of the vehicle correspond to the original specifications for that vehicle type, as guaranteed by the manufacturer. The manufacturer will also be able to track all changes in the ECUs of the vehicle, since all issued access applications will be stored in the database together with the specific use of the access application.

In another example of the invention, the access application is used to add an additional software module to an ECU of the vehicle control system. This may include adding a further function to an existing software system, such as adding a further navigation feature to a navigation system. It may also include adding or enabling a software function required for an added vehicle component, such as enabling a light output in a light control ECU when a light switch is added. The access application is ordered from the central database in the same way as described above. When a vehicle component is added, the access application may already be ready in the database and can be forwarded to the workshop by entering a code attached to the hardware part.

When the access application is run at the workshop, the ECU is unlocked by the access application. The software module is then downloaded to a predefined area in the ECU memory that is foreseen for additional software modules. By reserving a specific memory area in the ECU, it is ensured that the original software of the ECU cannot be changed or altered. When a software module that is already present in the ECU is to be enabled, an enabling code is sent to the ECU that will enable that specific function. When the new software module is stored, or the software module is enabled, a confirm message is sent to the update instrument indicating that the data is stored properly. The ECU is then locked again. When the operation is completed, the access application will self-destruct by corrupting the data code such that it cannot be used again.

The inventive arrangement and method is adapted for updating data parameters or adding a software module to existing software in an ECU. The access application used will thus communicate with the ECU and will start by unlocking the ECU such that these data can be received and stored. The arrangement is not intended for a complete reprogramming of an ECU. A complete reprogramming should be handled by the manufacturer in order to secure that the reprogramming is performed in a proper manner. The inventive arrangement is thus intended to allow independent workshops to perform repairs on vehicles that include an update of data in at least one ECU in the vehicle. By using an access application compiled by the manufacturer, the independent workshop will be able to use original software which is updated to the latest standard which in turn ensures that the vehicle is updated in a proper manner.

The inventive arrangement also allows independent tool manufacturer to supply update instruments to workshops, in which original software from a manufacturer can be used to update the vehicle. At the same time, an unallowable external access to the ECUs is prohibited and by using software that is only possible to use once, it is further prohibited that the software is used more than once. The manufacturer will thus have a good control of the data installed in the vehicle.

The access application can also be adapted for a predefined number of vehicles, such that the access application can be used to update a predefined number of vehicles before it is corrupted. The access application can also be adapted to update more than one ECU of a vehicle in the same operation, using the same access application or to update information of more than one component in the same operation. In this way, the workshop can perform all necessary actions on a vehicle in the same operation, using the same access application.

Figure 2:
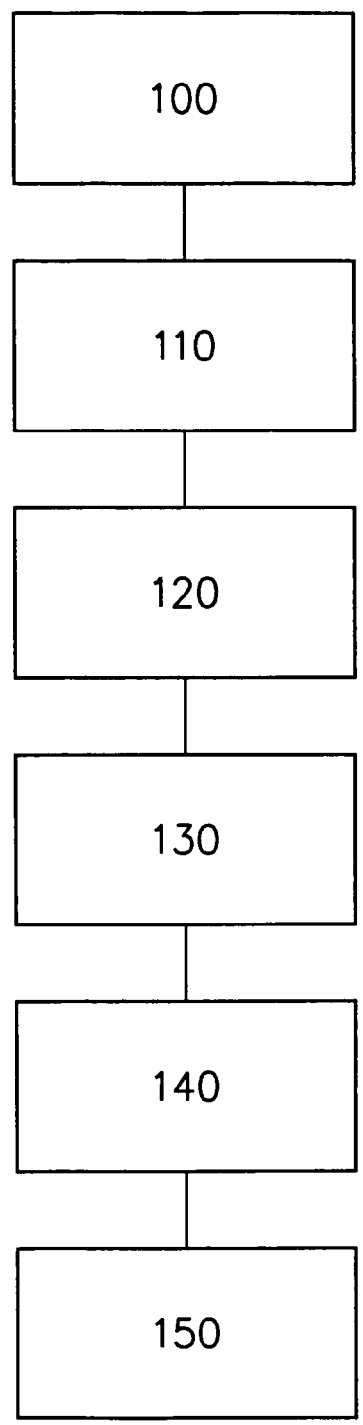
FIG. 2 shows a schematic flow chart of an inventive method for storing a data set in an ECU in a vehicle control system according to the invention.

FIG. 2 shows a schematic flow chart of a method for storing a data set in an ECU in a vehicle according to the invention.

In step 100, the computer means connected to the vehicle executes an access application, where the access application comprises vehicle specific information and service action specific information and where the information is encrypted.

The access application is encrypted in step 110 such that the vehicle specific information and service action specific information is retrieved.

In step 120, the ECU of the vehicle is unlocked by sending a password from the access application of the computer means to the ECU. The ECU may send an unlock acknowledge message back to the computer means to confirm the unlock operation.

The service action is performed in step 130 by storing the service action specific information in the ECU of the vehicle control system. The ECU may confirm the completion of the service action by sending a completion message back to the computer means to confirm the service action.

After the completion of the service action, the ECU is locked in step 140 by sending a lock command to the ECU from the access application of the computer means, such that unauthorised access to the ECU is further prohibited. The lock of the ECU may be acknowledged by sending a lock acknowledge message back to the computer means.

In step 150, the data code of the access application is corrupted by the computer means such that the access application cannot be used again.

The invention is not to be regarded as being limited to the embodiments described above, a number of additional variants and modifications being possible within the scope of the subsequent patent claims.

REFERENCE SIGNS

1: Arrangement for storing data
2: Computer means
3: Access application
4: Vehicle specific information
5: Service action information
6: Vehicle
7: ECU
8: Database

The invention claimed is:

1. An arrangement for storing a data set in an ECU in a vehicle control system when updating data of a vehicle in a workshop, wherein the arrangement comprises
a computer constituting an update instrument of the workshop, the computer being adapted to be connected to and disconnected from the vehicle, where the computer is located in a first location and is configured to receive an access application sent from a second location, the access application comprising vehicle specific information and service action specific information, and the vehicle specific information and service action specific information being encrypted, the service action specific information comprising a password for unlocking the vehicle ECU,
where the computer is configured to execute the access application including
decrypting the vehicle specific information and the service action specific information,
unlocking the vehicle ECU by sending the password from the computer to the ECU with the service action specific information of the access application,
performing a service action by storing service action specific information in the ECU, and
locking the ECU by sending a lock command to the ECU from the computer,
wherein the arrangement is adapted to corrupt the access application software after the service action specific information is stored in the ECU and when a lock acknowledge message is received by the computer from the ECU such that the access application cannot be used again.

2. Arrangement according to claim 1, wherein the access application is adapted to be used for a predefined number of vehicles, and that the corruption of the access application software is performed after the access application has been used the predefined number of times.

3. Arrangement according to claim 1, wherein the arrangement is adapted to update one or more data parameters corresponding to a vehicle component.

4. Arrangement according to claim 1, wherein the arrangement is adapted to add a software module to an existing software in the ECU.

5. Arrangement according to claim 1, wherein the access application is compiled by the manufacturer of the specific vehicle.

6. Arrangement according to claim 1, wherein the access application comprises information that will unlock more than one ECU in the vehicle.

7. Arrangement according to claim 1, wherein the access application for a specific vehicle is compiled by the manufacturer of the vehicle when a workshop demands it.

8. Arrangement according to claim 1, wherein an access application that comprises data corresponding to a specific hardware part is compiled when the hardware part is produced.

9. Arrangement according to claim 8, wherein the access application is linked to the hardware part by a unique number and that the access application can be retrieved by sending the unique number to the manufacturer of the hardware part and/or to the manufacturer of the vehicle.

10. A method for storing a data set in an ECU in a vehicle control system of a vehicle, where the method is performed in a work shop, comprising:
compiling an access application in a first location, where the access application comprises vehicle specific information and service action specific information, the vehicle specific information and service action specific information being encrypted, the service action specific information comprising a password for unlocking the vehicle ECU,
sending the access application to a computer in a workshop in a second location, the computer being connectable and disconnectable from the vehicle,
connecting the computer to the vehicle,
executing the access application in the computer including
decrypting the vehicle specific information and the service action specific information by the access application,
unlocking the vehicle ECU by sending the password from the access application to the ECU with the service action specific information of the access application, performing a service action by storing service action specific information in the ECU, locking the ECU by sending a lock command to the ECU from the access application, and corrupting the access application such that the access application cannot be used again.

11. Method according to claim 10, further comprising:

sending an unlock confirmation message from the ECU to the access application when the password has been received and the ECU is unlocked, sending a completed message from the ECU to the access application when the service action specific information has been successfully stored in the ECU, sending a lock confirmation message from the ECU to the access application when the ECU is locked.

12. Method according to claim 10, wherein the service action comprises an update of data parameters corresponding to a vehicle component.

13. Method according to claim 10, wherein the service action comprises adding a software module to an existing software in the ECU.

14. Method according to claim 10, wherein the access application is compiled by the manufacturer of the specific vehicle.

15. A computer comprising program code for performing a method for storing a data set in an ECU in a vehicle control system of a vehicle, where the method is performed in a work shop, the method comprising:

compiling an access application in a first location where the access application comprises vehicle specific information and service action specific information, the vehicle specific information and service action specific information being encrypted, the service action specific information comprising a password for unlocking the vehicle ECU, sending the access application to a computer in a workshop in a second location, the computer being connectable and disconnectable from the vehicle, connecting the computer to the vehicle, executing the access application in the computer including decrypting the vehicle specific information and the service action specific information by the access application, unlocking the vehicle ECU by sending the password from the access application to the ECU with the service action specific information of the access application, performing a service action by storing service action specific information in the ECU, locking the ECU by sending a lock command to the ECU from the access application, and corrupting the access application such that the access application cannot be used again.

16. A computer program product comprising program code stored on a non-transitory computer readable medium for performing a method for storing a data set in an ECU in a vehicle control system of a vehicle, where the method is performed in a work shop, the method comprising:

compiling an access application in a first location, where the access application comprises vehicle specific information and service action specific information, the vehicle specific information and service action specific information being encrypted, the service action specific information comprising a password for unlocking the vehicle ECU, sending the access application to a computer in a workshop in a second location, the computer being connectable and disconnectable from the vehicle, connecting the computer to the vehicle, executing the access application in the computer including decrypting the vehicle specific information and the service action specific information by the access application, unlocking the vehicle ECU by sending the password from the access application to the ECU with the service action specific information of the access application, performing a service action by storing service action specific information in the ECU, locking the ECU by sending a lock command to the ECU from the access application, and corrupting the access application such that the access application cannot be used again.

* * * * *